United States Patent [19]

Huang

[11] Patent Number: 4,859,219
[45] Date of Patent: Aug. 22, 1989

[54] APPARATUS FOR PRECIPITATING EXHAUSTED SMOKE FROM A CHIMNEY

[76] Inventor: Chien-Feng Huang, No. 8 Alley 49, Lane 36, Sec. 2 Li-Hsing Road, Sanchung City, Taipei Hsien, Taiwan

[21] Appl. No.: 128,020

[22] Filed: Dec. 2, 1987

[51] Int. Cl.$^4$ .............................................. B01D 53/14
[52] U.S. Cl. ....................................... 55/223; 55/248; 55/250; 55/DIG. 30; 261/116; 261/17
[58] Field of Search ................. 55/223, 233, 248, 250, 55/DIG. 30; 261/116, DIG. 9, 17

[56] References Cited

U.S. PATENT DOCUMENTS

| | | | |
|---|---|---|---|
| 824,800 | 7/1906 | Matthews | 261/116 X |
| 888,119 | 5/1908 | Richards | 261/116 |
| 2,646,263 | 7/1953 | Goldberg | 55/233 X |
| 2,688,943 | 9/1954 | Wickland | 261/116 X |
| 3,572,264 | 3/1971 | Mercer | 55/233 X |
| 3,835,796 | 9/1974 | Sanga | 261/116 X |
| 4,012,208 | 3/1977 | Arnim et al. | 55/223 |
| 4,141,701 | 2/1979 | Ewan et al. | 261/116 X |
| 4,529,421 | 7/1985 | Parma | 261/DIG. 9 X |

Primary Examiner—Charles Hart
Attorney, Agent, or Firm—Klein & Vibber

[57] ABSTRACT

An apparatus for treating the exhausted smoked from a chimney by precipitation has a smoke collecting device placed at the exhaust of the chimney and a vapour injecting nozzle to spray high speed vapour over the smoke from the chimney into the collecting device. A water tank for receiving the mixture of the vapour and the smoke and precipitating the same with the water contained therein is connected to the collecting device by a conduit. The conduit is provided with suction means to accelerate the flow of the mixture of the vapour and the smoke to the tank. The water tank may also be equipped with set of vapour spraying devices and a smoke filtering web for preventing the possible leakage of smoke from the water tank. A preferred embodiment has two opposing collecting devices, each provided with its own conduit, suction means, and tank.

5 Claims, 1 Drawing Sheet

APPARATUS FOR PRECIPITATING EXHAUSTED SMOKE FROM A CHIMNEY

FIELD OF THE INVENTION

The present invention relates to an apparatus for precipitating the smoke from a chimney using water.

BACKGROUND OF THE INVENTION

Because of the rapid development of heavy industry, air pollution has become the most dangerous enemy to modern human beings. The smoke from the chimney of factories is now threatening the survival of agriculture, animals, and human beings. Moreover, smoke from chimneys often contains poisonous gas which can cause death to thousands of people such as in the tragedy that took place in India in 1984. It is therefore fundamental that all factories be equipped with smoke treatment apparatus, especially those factories engaged in the manufacture of pulp and paper, dye materials, poisonous chemicals, and woven textiles.

DESCRIPTION OF THE PRIOR ART

Conventional apparatuses for treating the smoke from a factory chimney include fabric filters, wet scrubbers, and so-called electrostatic precipitators. It has been known that fabric filters are not efficient in smoke collecting and cleaning. Wet scrubbers, although more efficient than fabric filters, have a principle disadvantage of causing an odor in the flue gas and increasing the risk of corrosion in the chimney. Electrostatic precipitators are very effective in treating the smoke. However, there is danger in the installation of electrodes, high costs in both installation and maintenance, and the necessity to move away the collected dust from the apparatus in a very complicated process.

SUMMARY OF THE INVENTION

It is therefore a principle object of the present invention to provide an apparatus for treating the smoke from a factory chimney without the disadvantages of the conventional apparatuses.

Another object of the present invention is to provide an apparatus for treating the smoke which is simple and inexpensive in its construction, installation, operation and maintenance.

Still another object of the present invention is to provide an apparatus for treating the smoke with water and completely cleaning the smoke exhausted from a chimney of a factory.

Accordingly, the apparatus of the present invention for precipitating the exhausted smoke of a chimney has the following important features:

it effectively collects the smoke by the use of a funnel-shaped smoke collecting device;

it effectively collects the smoke by injecting water vapour over the smoke from an injection nozzle which is equipped at the funnel-shaped smoke collecting device;

it introduces the mixture of the water vapour and the smoke into a water tank for precipitating the same in the water tank by water contained therein; and it further precipitates the smoke from the water tank by a set of filtering web and a second water vapour spraying device.

Thus, the present invention comprises a funnel-shaped smoke collecting means provided at the exhaust of the chimney; a vapour injection nozzle provided at said funnel-shaped smoke collecting means for spraying a high speed water vapour over the exhaust of the chimney; a water tank having a conduit connected to said smoke collecting means for receiving the smoke and precipitating the same therein; and a suction means provided in said conduit for accelerating the vapour and the smoke into the water tank.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENT

Figure 1:
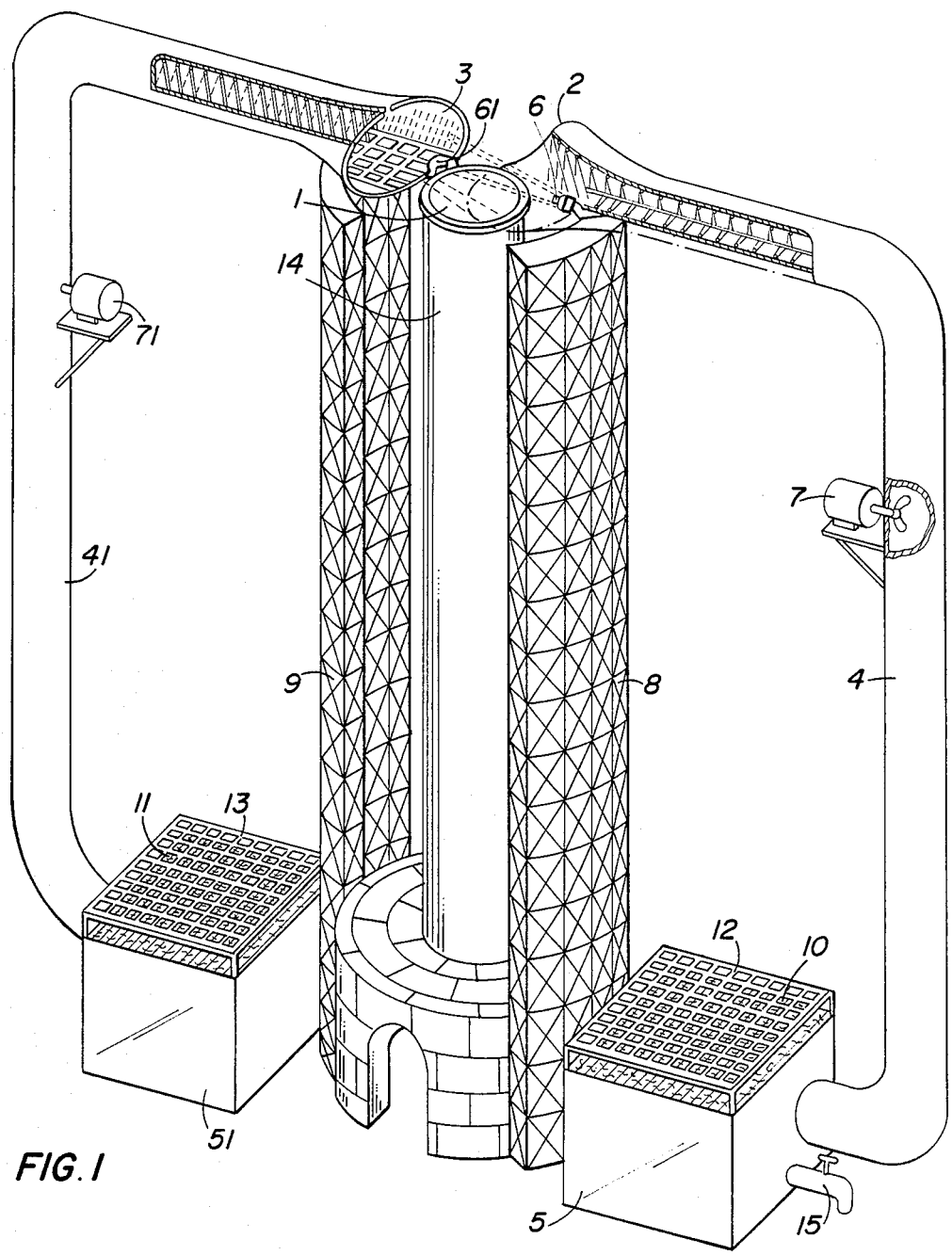
FIG. 1 is an illustrative perspective view showing an embodiment of the apparatus for treating the exhausted smoke from the chimney of a factory.
Figure 2:
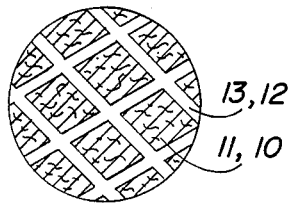
FIG. 2 is an exploded view of a portion of FIG. 1 shown in the circle marked X.

Referring to FIG. 1, the apparatus includes a pair of funnel-shaped smoke collectors 2, 3, at the chimney exhaust 1 and supported by a respective frame 8, 9. Water tanks, 5, 51, with waters contained therein for the treating of the smoke are connected to the smoke collectors 2, 3, through conduits 4, 41. There are provided, respectively, at each funnel-shaped smoke collector 2, 3, a water vapour injection nozzle 6, 61, which will spray high speed pressured water vapour over the chimney exhaust to bring the smoke into the opposite smoke collector 3, 2.

In the conduit 4, 41, there is provided means, e.g. a motor driven fan 7, 71, for generating high speed suction air circulation to accelerate the mixture of water vapour and smoke to move towards the water tank 5, 51. Since the smoke received by the water tank 5, 51, may possibly leak therefrom, it is optional to provide on the water tank 5, 51, a set of filtering web 10, 11, and water vapour spraying device 12, 13.

MANNER OF OPERATION

In operation, the motor of the motor driven fan or other suction means 7, 71, is turned on and the nozzles 6, 61, start to inject water vapour over the exhaust 1 of the chimney 14. It should be noted that the funnel-shaped collectors 2, 3, have a low pressure area formed near the exhaust of the chimney because of the high speed water vapour stream injected by the injectors and accelerated by the suction means, e.g. fan 7, 71.

In addition, since the temperature in the vicinity of the suction means 7, 71, and the temperature in the conduit 4, 41, are relatively low in comparison with the temperature at the exhaust 1 of the chimney 14, the smoke has a natural tendency to move toward into the funnel-shaped smoke collectors 2, 3.

The mixture of water vapour together with the smoke dust carried therewith is fed into the water contained in the water tank 5, 51, and cleaned by the same. If a small amount of smoke is leaked from the water in the form of a gas bubble, it will be filtered by the filtering web 10, 11, and in addition drained by sprayed vapour from the spraying device 12, 13. The smoke is thus completely cleaned by the apparatus of the invention.

In the preferred embodiment of the apparatus, there is also an outlet 15 provided at the lower most portion of the water tank 5, 51, for the removal of the collected smoke dust accumulated within the water tank 5, 51.

Although the invention is described and illustrated with reference to a plurality of embodiments thereof, it is to be expressly understood that it is in no way limited to the disclosure of such preferred embodiments but is capable of numerous modifications within the scope of the appended claims.

I claim:

1. An apparatus for precipitating smoke from a chimney having an exhaust outlet, said apparatus comprising:
    a funnel-shaped smoke collecting means provided adjacent to but not encompassing the exhaust outlet of the chimney;
    a vapour injection nozzle provided opposite said funnel-shaped smoke collecting means for spraying a high speed water vapour over the exhaust outlet of the chimney;
    a water tank having a conduit connected to said smoke collecting means for receiving the smoke and precipitating the same therein; and
    a suction means provided in said conduit for accelerating said vapour and smoke into said water tank;
    said water vapour from said nozzle precipitating the smoke exhausted from the chimney and bringing the same into said water tank for further precipitation of the smoke by the water in the water tank.

2. An apparatus as claimed in claim 1 wherein said suction means are a motor diven fan installed within said conduit for generating a high speed air circulation.

3. An apparatus as claimed in claim 1 wherein said water tank further includes a filtering web provided at a top portion thereof for filtering smoke from any gas escaping from the water tank.

4. An apparatus as claimed in claim 3 wherein said water tank further includes a water injecting means provided on top of said filtering web for further precipitating smoke from escaping from the water tank.

5. An apparatus as claimed in claim 1 wherein two smoke collecting means are provided with opposing water vapor injection means are provided opposite one another, each collecting means having its own conduit, suction means, and water tank.

* * * * *